US012089229B2

(12) United States Patent
Behravan et al.

(10) Patent No.: US 12,089,229 B2
(45) Date of Patent: **\*Sep. 10, 2024**

(54) PDCCH MONITORING PERIODICITY

(71) Applicant: Telefonaktiebolaget LM Ericsson (publ), Stockholm (SE)

(72) Inventors: Ali Behravan, Stockholm (SE); Sorour Falahati, Stockholm (SE); Havish Koorapaty, Saratoga, CA (US); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,881

(22) Filed: Jan. 12, 2023

(65) Prior Publication Data
US 2023/0156731 A1 May 18, 2023

Related U.S. Application Data

(63) Continuation of application No. 17/498,050, filed on Oct. 11, 2021, now Pat. No. 11,558,867, which is a
(Continued)

(51) Int. Cl.
*H04W 72/23* (2023.01)
*H04L 5/00* (2006.01)
(Continued)

(52) U.S. Cl.
CPC ............... *H04W 72/23* (2023.01); *H04L 5/00* (2013.01); *H04L 5/0053* (2013.01);
(Continued)

(58) Field of Classification Search
CPC ........... H04W 72/042; H04W 72/0446; H04W 24/02; H04W 4/00; H04L 5/00; H04L 5/0053; H04L 5/001; H04L 41/0803
See application file for complete search history.

(56) References Cited

U.S. PATENT DOCUMENTS 10,153,883 B2   12/2018   Skoric
10,244,518 B2    3/2019   Chen
(Continued)

FOREIGN PATENT DOCUMENTS

CN    102056185 A1    5/2011
CN    102202324 A1    9/2011
(Continued)

OTHER PUBLICATIONS

European Patent Office, PCT, Notification of Transmittal of the International Search Report and the Written Opinion of the International Searching Authority, or the Declaration, International Application No. PCT/IB2018/057618, by Applicant, Telefonaktiebolaget LM Ericsson (Publ), Mailing Date: Feb. 19, 2019, 15 pages.
(Continued)

*Primary Examiner* — Jenee Holland
(74) *Attorney, Agent, or Firm* — Baker Botts L.L.P.

(57) ABSTRACT

According to some embodiments, a method in a network node for configuring monitoring occasions for use in a network node of a wireless communication network comprises determining a physical downlink control channel (PDCCH) search space monitoring configuration for a wireless device. The PDCCH search space monitoring configuration comprises a monitoring periodicity and a number of blind decodes for each search space of a plurality of search spaces over a plurality of slots. The method further comprises sending the monitoring configuration to the wireless device. A method in a wireless device comprises receiving the monitoring configuration and monitoring each search space according to the monitoring configuration.

22 Claims, 11 Drawing Sheets

Related U.S. Application Data continuation of application No. 16/886,241, filed on May 28, 2020, now Pat. No. 11,147,057, which is a continuation of application No. 16/210,142, filed on Dec. 5, 2018, now Pat. No. 10,687,324, which is a continuation of application No. PCT/IB2018/057618, filed on Oct. 1, 2018.

(60) Provisional application No. 62/567,075, filed on Oct. 2, 2017.

(51) Int. Cl.
  *H04L 41/0803* (2022.01)
  *H04W 72/0446* (2023.01)

(52) U.S. Cl.
  CPC ..... *H04L 41/0803* (2013.01); *H04W 72/0446* (2013.01); *H04L 5/001* (2013.01)

(56) References Cited

U.S. PATENT DOCUMENTS

| | | | |
|---|---|---|---|
| 10,250,420 | B2 | 4/2019 | Nory |
| 10,448,389 | B1 | 10/2019 | Seo |
| 2010/0279628 | A1 | 11/2010 | Love |
| 2010/0318871 | A1 | 12/2010 | Lee |
| 2011/0038275 | A1 | 2/2011 | Kim |
| 2011/0085506 | A1 | 4/2011 | Lee |
| 2011/0286413 | A1 | 11/2011 | Nishio |
| 2012/0033643 | A1 | 2/2012 | Noh |
| 2012/0039180 | A1 | 2/2012 | Kim |
| 2013/0044712 | A1 | 2/2013 | Kim |
| 2013/0114563 | A1 | 5/2013 | Oizumi |
| 2013/0121295 | A1 | 5/2013 | Saito |
| 2013/0136095 | A1 | 5/2013 | Nishio |
| 2013/0163543 | A1 | 6/2013 | Freda |
| 2013/0163573 | A1 | 6/2013 | Oizumi |
| 2013/0183987 | A1 | 7/2013 | Vrzic |
| 2013/0194956 | A1 | 8/2013 | Sartori |
| 2014/0064215 | A1 | 3/2014 | Wu |
| 2014/0112263 | A1 | 4/2014 | Lee |
| 2014/0133427 | A1 | 5/2014 | Kim |
| 2014/0192755 | A1 | 7/2014 | Kim |
| 2014/0204819 | A1 | 7/2014 | Ohta |
| 2014/0219196 | A1 | 8/2014 | Patel |
| 2014/0254544 | A1 | 9/2014 | Kar Kin Au |
| 2014/0293942 | A1 | 10/2014 | Kang |
| 2014/0301286 | A1 | 10/2014 | Abe |
| 2015/0189574 | A1 | 7/2015 | Ng |
| 2015/0358962 | A1 | 12/2015 | Lee |
| 2015/0358985 | A1 | 12/2015 | Chen |
| 2016/0088604 | A1 | 3/2016 | Patel |
| 2016/0088652 | A1 | 3/2016 | Patel |
| 2016/0143029 | A1 | 5/2016 | Goto |
| 2016/0270059 | A1 | 9/2016 | Chen |
| 2016/0337112 | A1 | 11/2016 | Suzuki |
| 2016/0345364 | A1 | 11/2016 | Uchino |
| 2016/0381681 | A1 | 12/2016 | Nogami |
| 2017/0135084 | A1 | 5/2017 | Kuchibhotla |
| 2017/0196002 | A1 | 7/2017 | Sartori |
| 2017/0223670 | A1 | 8/2017 | Chen |
| 2017/0230135 | A1 | 8/2017 | Oh |
| 2017/0264417 | A1* | 9/2017 | Eriksson ............... H04L 5/0053 |
| 2017/0279646 | A1 | 9/2017 | Yi |
| 2017/0374653 | A1 | 12/2017 | Lee |
| 2018/0262398 | A1* | 9/2018 | Chen ................... H04L 41/0836 |
| 2018/0359740 | A1 | 12/2018 | Sartori |
| 2019/0020461 | A1 | 1/2019 | Yerramalli |
| 2019/0150073 | A1 | 5/2019 | Tiirola |
| 2020/0244507 | A1* | 7/2020 | Pan ..................... H04L 27/2676 |

FOREIGN PATENT DOCUMENTS

| | | |
|---|---|---|
| CN | 103650447 A1 | 3/2014 |
| CN | 104754741 A1 | 7/2015 |
| CN | 104904257 A1 | 9/2015 |
| EP | 2943002 A1 | 11/2015 |
| JP | 2016509395 A | 3/2016 |

OTHER PUBLICATIONS

Intel Corporation, "PDCCH search spaces and monitoring," 3GPP TSG RAN WG1 #90, Prague, P.R. Czehia, Aug. 21-25, 2017, #R1-1712569, 11 pages.

Samsung, "NR-PDCCH design for Short Monitoring Periods," 3GPP TSG RAN WG1 Meeting #89, Hangzhou, China, May 15-19, 2017, #R1-1707992, 4 pages.

Vivo, "Discussion on search space and blind deoding design," 3GPP TSG RAN WG1 Meeting #90, Prague, Czech Republic, Aug. 21-25, 2017, #R1-1712847, 6 pages.

NTT Docomo, Inc., "Search space for sTTI operation," 3GPP TSG RAN WG1 Meeting #89, Hangzhou, P.R. China, May 15-19, 2017, #R1-1708416, 5 pages.

China Patent Office Official Action in CN Application No. 201880064629.9 dated Jan. 5, 2022 (not translated).

Configuration of PDCCH candidate sets for the control of blind decoding attempts, 3GPP TSG RAN WG1 Meeting #52, R1-080675, Feb. 11-15, 2088.

"Some remaining issues on Coreset configuration," Guangdong OPPO Mobile Telecom, 3GPP TSG RAN WG1 Meeting #90, R1-1713259, Aug. 21-25, 2017.

"Coreset configuration and Search space for NR-PDCCH," ZTE, Sanechips, 3GPP TSG RAN WG1 Meeing 90bis, R1-1717511, Oct. 9-13, 2017.

"Discussion of search space design," OPPO, 3GPPTSG RAN WG1 Meeting #90bis, R1-1718043, Oct. 9-13, 2017.

* cited by examiner

PDCCH MONITORING PERIODICITY

PRIORITY

This application is a continuation, under 35 U.S.C. § 120 of U.S. patent application Ser. No. 17/498,050 filed on Oct. 11, 2021 which is a continuation, under 35 U.S.C. § 120, of U.S. patent application Ser. No. 16/886,241 filed on May 28, 2020, which is a continuation U.S. patent application Ser. No. 16/210,142 filed Dec. 5, 2018 which is a continuation of International Patent Application No. PCT/IB2018/057618 filed Oct. 1, 2018, which claims the benefit of U.S. Provisional Patent Application No. 62/567,075 filed Oct. 2, 2017, all of which are incorporated herein by reference as if reproduced in their entirety.

TECHNICAL FIELD

Particular embodiments are directed to wireless communications and, more particularly, to a periodicity for monitoring physical downlink control channels (PDCCH).

INTRODUCTION

The new radio (NR) standard in Third Generation Partnership Project (3GPP) includes service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission, but perhaps for moderate data rates.

One solution for low latency data transmission is shorter transmission time intervals. In NR, in addition to transmission in a slot, a mini-slot transmission is used to reduce latency. A mini-slot may consist of any number of 1 to 14 orthogonal frequency division multiplexing (OFDM) symbols. The concepts of slot and mini-slot are not specific to a specific service, meaning that a mini-slot may be used for either eMBB, URLLC, or other services.

FIG. 1 illustrates an example radio resource in new radio (NR). The horizontal axis represents time and the other axis represents frequency. Each resource element corresponds to one OFDM subcarrier during one OFDM symbol interval.

The 3GPP NR standard includes a monitoring periodicity that can be configured for a user equipment (UE)-specific control-resource set (CORESET). The monitoring periodicity may be configured per CORESET or for a set of physical downlink control channel (PDCCH) candidates within the CORESET. Different monitoring periodicities for different search spaces provide flexibility.

A problem, however, is if different monitoring periodicities are configured for different search spaces, then a UE may have to perform several blind decodings in a slot with multiple PDCCHs but perform very few blind decodings on the other slots.

SUMMARY

The embodiments described herein include adjusting and distributing physical downlink control channel (PDCCH) monitoring occasions so that the number of blind decodes in every slot is the same (or close to the same) to efficiently use available blind decoding opportunities.

According to some embodiments, a method in a network node for configuring monitoring occasions for use in a network node of a wireless communication network comprises determining a PDCCH search space monitoring configuration for a wireless device. The PDCCH search space monitoring configuration comprises a monitoring periodicity and a number of blind decodes for each search space of a plurality of search spaces over a plurality of slots. The method further comprises sending the monitoring configuration to the wireless device.

According to some embodiments, a network node is capable of configuring monitoring occasions in a wireless communication network. The network node comprises processing circuitry operable to determine a PDCCH search space monitoring configuration for a wireless device. The PDCCH search space monitoring configuration comprises a monitoring periodicity and a number of blind decodes for each search space of a plurality of search spaces over a plurality of slots. The processing circuitry is further operable to send the monitoring configuration to the wireless device.

A particular advantage is that the number of blind decodes is configurable for each search space. Accordingly, the network node is able to optimize the available blind decoding opportunities.

In particular embodiments, a total number of blind decodes to be performed in each slot of the plurality of slots is equivalent for all slots. In some embodiments, the number of blind decodes for each search space is equivalent for all slots. The number of blind decodes for each search space may vary among slots. The number of blind decodes for each search space in a slot may be equivalent for all search spaces in the slot. The number of blind decodes for each search space in a slot may vary among search spaces in the slot.

In particular embodiments, a total number of blind decodes to be performed in a slot of the plurality of slots exceeds a total number of blind decodes that the wireless device is capable of performing in the slot. The PDCCH search space monitoring configuration may further comprise an indication whether a search space may be monitored using fewer than the configured number of blind decodes. The indication whether the search space may be monitored using fewer than the configured number of blind decodes may comprise an indication of whether a search space is a common search space or a user equipment specific search space.

A particular advantage is that the network node may oversubscribe the number of blind decodes for a slot or search space. The wireless device then determines an optimal use of blind decodes by determining which slots and search spaces to limit the number of blind decodes.

According to some embodiments, a method for use in a wireless device of monitoring signals comprises receiving a PDCCH search space monitoring configuration from a network node. The monitoring configuration comprises a monitoring periodicity and a number of blind decodes for each search space of a plurality of search spaces over a plurality of slots. The method further comprises monitoring each search space according to the monitoring configuration (i.e., the monitoring periodicity and the number of blind decodes).

In particular embodiments, a total number of blind decodes to be performed in each slot of the plurality of slots is equivalent for all slots. In some embodiments, the number of blind decodes for each search space is equivalent for all slots. The number of blind decodes for each search space may vary among slots. The number of blind decodes for each search space in a slot may be equivalent for all search spaces in the slot. The number of blind decodes for each search space in a slot may vary among search spaces in the slot.

In particular embodiments, the total number of blind decodes to be performed in a slot of the plurality of slots exceeds a total number of blind decodes that the wireless device is capable of performing in the slot. The method further comprises limiting a number of blind decodes to be performed in one more search spaces so that the total number of blind decodes in each slot is less than or equal to the total number of blind decodes that the wireless device is capable of performing in the slot. Limiting the number of blind decodes may be based on preconfigured rules for prioritizing a first search space over a second search space. In some embodiments, the PDCCH search space monitoring configuration further comprises an indication whether a search space may be monitored using fewer than the configured number of blind decodes. The indication whether the search space may be monitored using fewer than the configured number of blind decodes may comprise an indication of whether a search space is a common search space or a user equipment specific search space.

According to some embodiments, a wireless device is capable of monitoring signals in a wireless communication network. The wireless device comprises processing circuitry operable to receive a PDCCH search space monitoring configuration from a network node. The monitoring configuration comprises a monitoring periodicity and a number of blind decodes for each search space of a plurality of search spaces over a plurality of slots. The processing circuitry is further operable to monitor each search space according to the monitoring configuration (i.e., the monitoring periodicity and the number of blind decodes).

In particular embodiments, a total number of blind decodes to be performed in each slot of the plurality of slots is equivalent for all slots. In some embodiments, the number of blind decodes for each search space is equivalent for all slots. The number of blind decodes for each search space may vary among slots. The number of blind decodes for each search space in a slot may be equivalent for all search spaces in the slot. The number of blind decodes for each search space in a slot may vary among search spaces in the slot.

In particular embodiments, the total number of blind decodes to be performed in a slot of the plurality of slots exceeds a total number of blind decodes that the wireless device is capable of performing in the slot. The processing circuitry is further operable to limit a number of blind decodes to be performed in one or more search spaces so that the total number of blind decodes in each slot is less than or equal to the total number of blind decodes that the wireless device is capable of performing in the slot. In some embodiments, the processing circuitry is operable to limit the number of blind decodes based on preconfigured rules for prioritizing a first search space over a second search space. The PDCCH search space monitoring configuration may further comprise an indication whether a search space may be monitored using fewer than the configured number of blind decodes. The indication whether the search space may be monitored using fewer than the configured number of blind decodes may comprise an indication of whether a search space is a common search space or a user equipment specific search space.

According to some embodiments, a network node is capable of configuring monitoring occasions in a wireless communication network. The network node comprises a determining module and a transmitting module. The determining module is operable to determine a PDCCH search space monitoring configuration for a wireless device. The PDCCH search space monitoring configuration comprises a monitoring periodicity and a number of blind decodes for each search space of a plurality of search spaces over a plurality of slots. The transmitting module is operable to send the monitoring configuration to the wireless device.

According to some embodiments, a wireless device is capable of monitoring signals in a wireless communication network. The wireless device comprises a receiving module and a determining module. The receiving module is operable to receive a PDCCH search space monitoring configuration from a network node. The monitoring configuration comprising a monitoring periodicity and a number of blind decodes for each search space of a plurality of search spaces over a plurality of slots. The determining module is operable to monitor each search space according to the monitoring configuration (i.e., the monitoring periodicity and the number of blind decodes).

Also disclosed is a computer program product. The computer program product comprises instructions stored on non-transient computer-readable media which, when executed by a processor, perform the step of determining a PDCCH search space monitoring configuration for a wireless device. The PDCCH search space monitoring configuration comprises a monitoring periodicity and a number of blind decodes for each search space of a plurality of search spaces over a plurality of slots. The instructions further perform the step of sending the monitoring configuration to the wireless device.

Another computer program product comprises instructions stored on non-transient computer-readable media which, when executed by a processor, perform the step of receiving a PDCCH search space monitoring configuration from a network node. The monitoring configuration comprises a monitoring periodicity and a number of blind decodes for each search space of a plurality of search spaces over a plurality of slots. The instructions further perform the step of monitoring each search space according to the monitoring configuration (i.e., the monitoring periodicity and the number of blind decodes).

Particular embodiments may include some, all, or none of the following advantages. For example, particular embodiments distribute the number of blind decodes over multiple monitoring occasions, which can be advantageous because the user equipment (UE) is only capable of performing a certain number of blind decodes at a time.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Third Generation Partnership Project (3GPP) new radio (NR) includes services such as enhanced mobile broadband (eMBB), ultra-reliable and low latency communication (URLLC), and machine type communication (MTC). Each of these services has different technical requirements with respect to data rate, latency, and coverage levels. To support these features. NR includes transmission in a slot as well as a mini-slot to reduce latency.

The 3GPP NR standard includes a monitoring periodicity that can be configured for a user equipment (UE)-specific control-resource set (CORESET). The monitoring periodicity may be configured per CORESET or for a set of physical downlink control channel (PDCCH) candidates within the CORESET. Different monitoring periodicities for different search spaces provide flexibility.

A problem, however, is if different monitoring periodicities are configured for different search spaces, then a UE may have to perform several blind decodings in a slot with multiple PDCCHs but perform very few blind decodings on the other slots. Particular embodiments obviate the problem described above and include adjusting and distributing PDCCH monitoring occasions so that the number of blind decodes in every slot is the same (or nearly the same), which can be advantageous because the UE is only capable of performing a certain number of blind decodes at a time.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 2-11B of the drawings, like numerals being used for like and corresponding parts of the various drawings. long term evolution (LTE) and fifth generation (5G) NR are used throughout this disclosure as an example cellular system, but the ideas presented herein may apply to other wireless communication systems as well.

Figure 1:
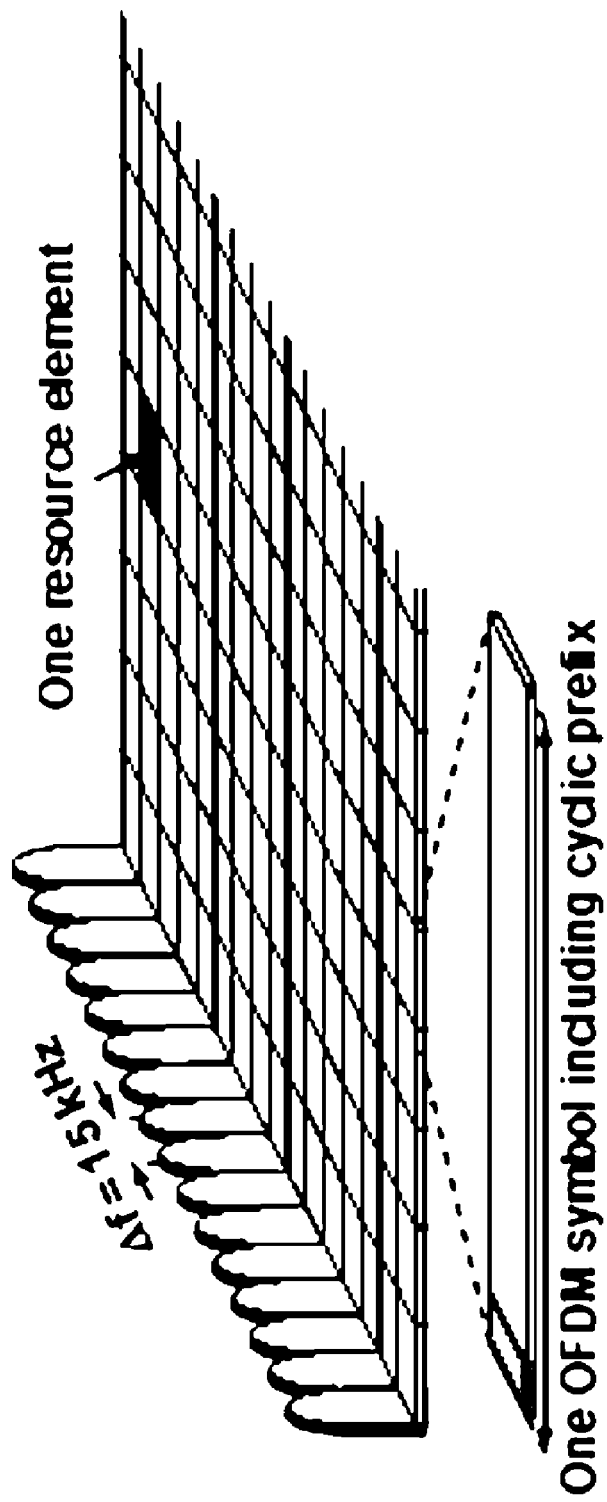
FIG. 1 illustrates an example radio resource in new radio (NR)
Figure 2:
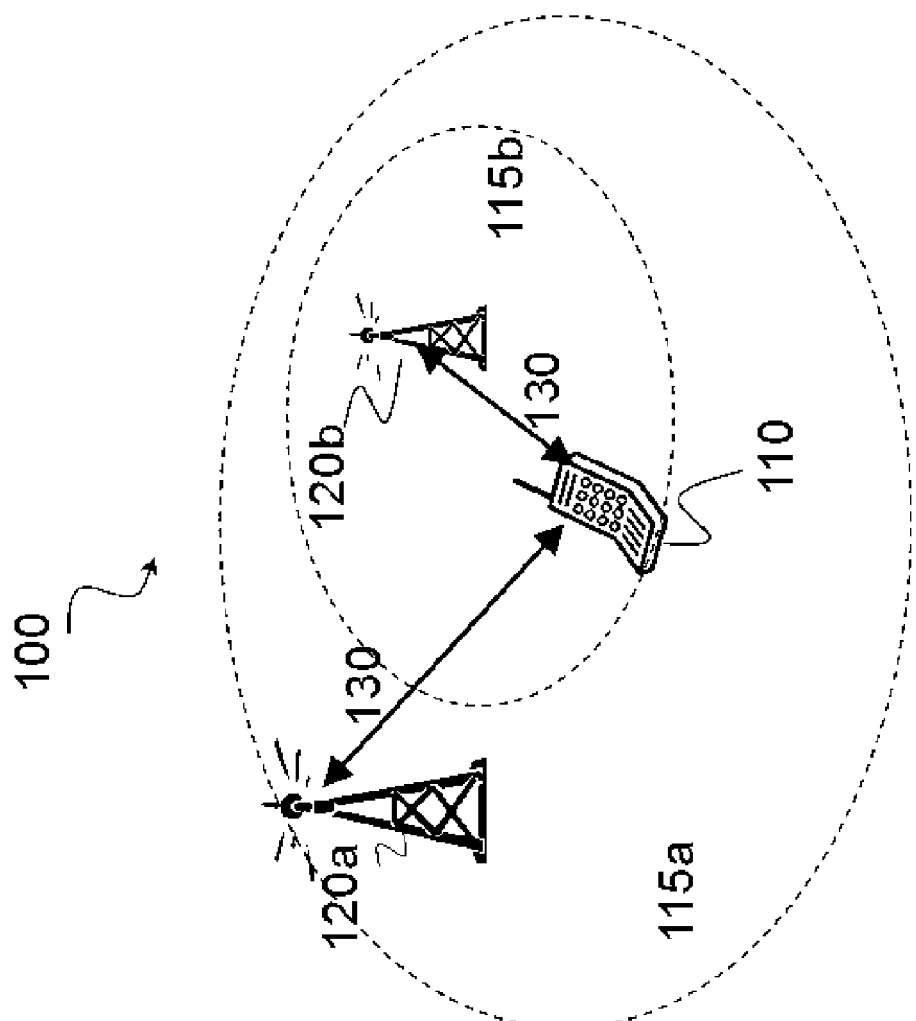
FIG. 2 is a block diagram illustrating an example wireless network, according to a particular embodiment.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations, eNodeBs, gNBs, etc.). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120).

Each network node 120 may have a single transmitter or multiple transmitters for transmitting signals 130 to wireless devices 110. In some embodiments, network node 120 may comprise a multiple-input multiple-output (MIMO) system. Wireless signal 130 may comprise one or more beams. Particular beams may be beamformed in a particular direction. Each wireless device 110 may have a single receiver or multiple receivers for receiving signals 130 from network nodes 120 or other wireless devices 110. Wireless device 110 may receive one or more beams comprising wireless signal 130.

Wireless signals 130 may be transmitted on time-frequency resources. The time-frequency resources may be partitioned into radio frames, subframes, slots, and/or mini-slots. Network node 120 may dynamically schedule subframes/slots/mini-slots as uplink, downlink, or a combination uplink and downlink. Different wireless signals 130 may comprise different transmission processing times.

Network node 120 may operate in a licensed frequency spectrum, such as an LTE spectrum. Network node 120 may also operate in an unlicensed frequency spectrum, such as a 5 GHz Wi-Fi spectrum. In an unlicensed frequency spectrum, network node 120 may coexist with other devices such as IEEE 802.11 access points and terminals. To share the unlicensed spectrum, network node 120 may perform LBT protocols before transmitting or receiving wireless signals 130. Wireless device 110 may also operate in one or both of licensed or unlicensed spectrum and in some embodiments may also perform LBT protocols before transmitting wireless signals 130. Both network node 120 and wireless device 110 may also operate in licensed shared spectrum.

For example, network node 120a may operate in a licensed spectrum and network node 120b may operate in an unlicensed spectrum. Wireless device 110 may operate in both licensed and unlicensed spectrum. In particular embodiments, network nodes 120a and 120b may be configurable to operate in a licensed spectrum, an unlicensed spectrum, a licensed shared spectrum, or any combination. Although the coverage area of cell 115b is illustrated as included in the coverage area of cell 115a, in particular embodiments the coverage areas of cells 115a and 115b may overlap partially or may not overlap at all.

In particular embodiments, wireless device 110 and network nodes 120 may perform carrier aggregation. For example, network node 120a may serve wireless device 110 as a PCell and network node 120b may serve wireless device 110 as a SCell. Network nodes 120 may perform self-scheduling or cross-scheduling. If network node 120a is operating in licensed spectrum and network node 120b is operating in unlicensed spectrum, network node 120a may provide license assisted access to the unlicensed spectrum (i.e., network node 120a is a LAA PCell and network node 120b is a LAA SCell).

In particular embodiments, wireless signals 130 may comprises time/frequency resources that are grouped in control-resource sets (CORESETs), as described above. Network node 120 may configure wireless device 110 with a monitoring periodicity for wireless device 110 to monitor for particular channels, such as a PDCCH. Network node 120 may configure a number of blind decodes associated with each search space, CORESET, or DCI format. Wireless device 110 receives the monitoring configuration from network node 120. Wireless device may perform blind decoding according to the monitoring configuration (i.e., the monitoring periodicity and the number of blind decodes). In some embodiments, wireless device may modify the monitoring configuration (e.g., the network node configured more blind decodes than wireless device 110 is capable of and wireless device 110 determines which search space, CORESET, or DCI format to limit. Further details are described below and with respect to FIGS. 3-9.

In wireless network 100, each network node 120 may use any suitable radio access technology, such as long term evolution (LTE), LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 10A below. Similarly, a network node may include any suitable combination of hardware and/or software. For example, in particular embodiments, a network node, such as network node 120, may include the components described with respect to FIG. 11A below.

While the embodiments below are described using an example of blind decodes assigned to specific search spaces, the embodiments equally cover the application of the same principles to CORESETs or to DCI formats as well.

Particular embodiments include configuring PDCCH monitoring occasions to maximally use blind decoding capability. According to some embodiments, PDCCH monitoring periodicity and occasions are configured such that the number of blind decodes in every slot is the same. An example is illustrated in FIGS. 3 and 4.

Figure 3:
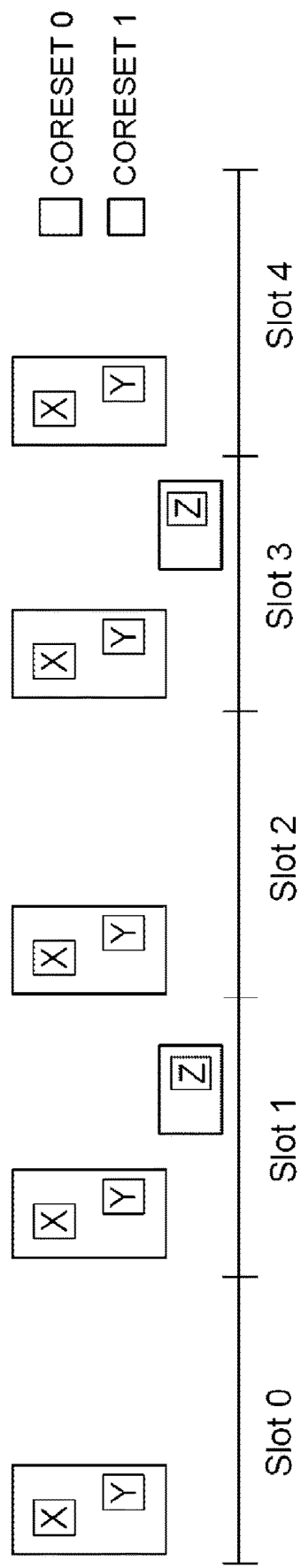
FIG. 3 is a block diagram illustrating two CORESETs with different search spaces and different periodicities, according to some embodiments.

FIG. 3 is a block diagram illustrating two CORESETs with different search spaces and different periodicities, according to some embodiments. In the illustrated example, CORESET 0 is transmitted in Slots 0, 1, 2, 3 . . . and has search spaces X and Y. CORESET 1 is transmitted in slots 1,3,5, . . . and has search space Z.

Figure 4:
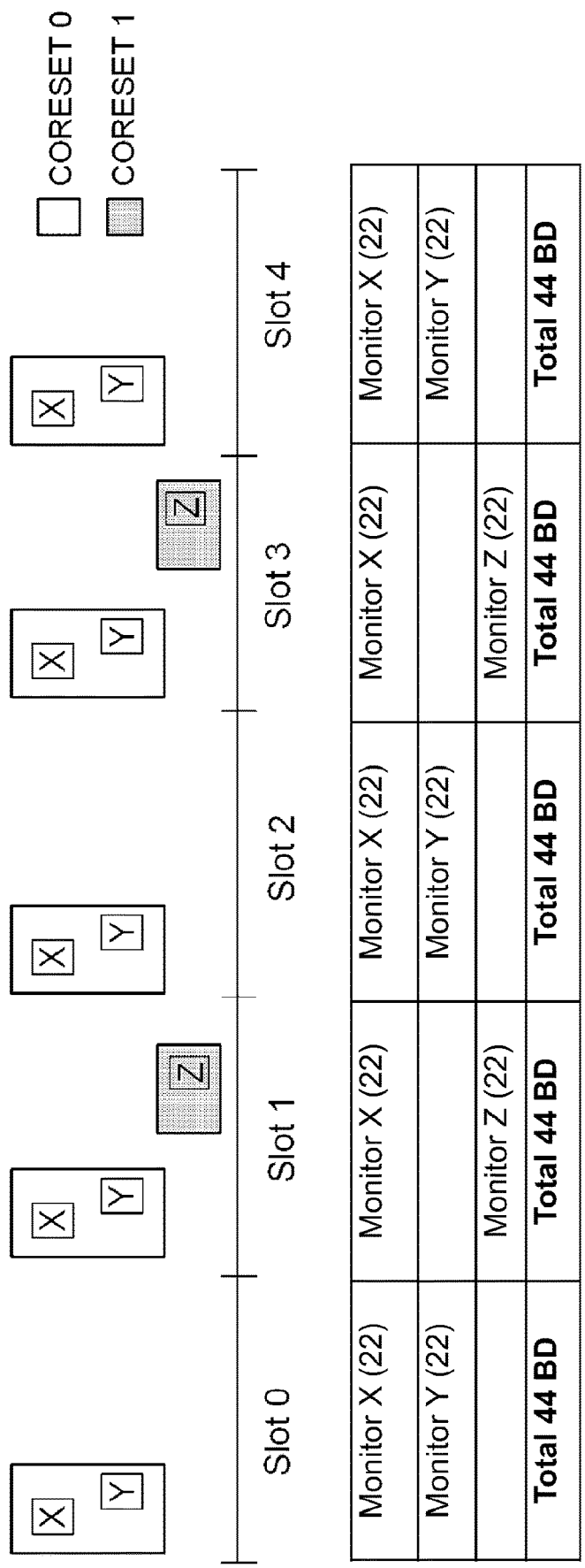
FIGS. 4-7 are block diagrams illustrating two CORESETs with different search spaces and different periodicities and the monitoring occasions associated with each CORESET, according to particular embodiments.

FIG. 4 is a block diagram illustrating two CORESETs with different search spaces and different periodicities and an equivalent number of blind decodes for each monitoring occasion, according to a particular embodiment. To keep the number of blind decodes the same, the UE monitors search space X with periodicity 0, 1, 2, . . . , and search space Y with periodicity 0, 2, 4, . . . and search space Z with periodicity 1, 3, 5, . . . as illustrated. The illustrated example includes a total of 44 blind decodes that can be performed within a slot. Other embodiments may include any suitable number of blind decodes and any suitable periodicity.

Particular embodiments include configuring blind decodes to maximally utilize blind decoding capability. According to some embodiments, the blind decodes that are assigned may be different in different slots and may have different periodicities associated with them. An example is illustrated in FIG. 5.

Figure 5:
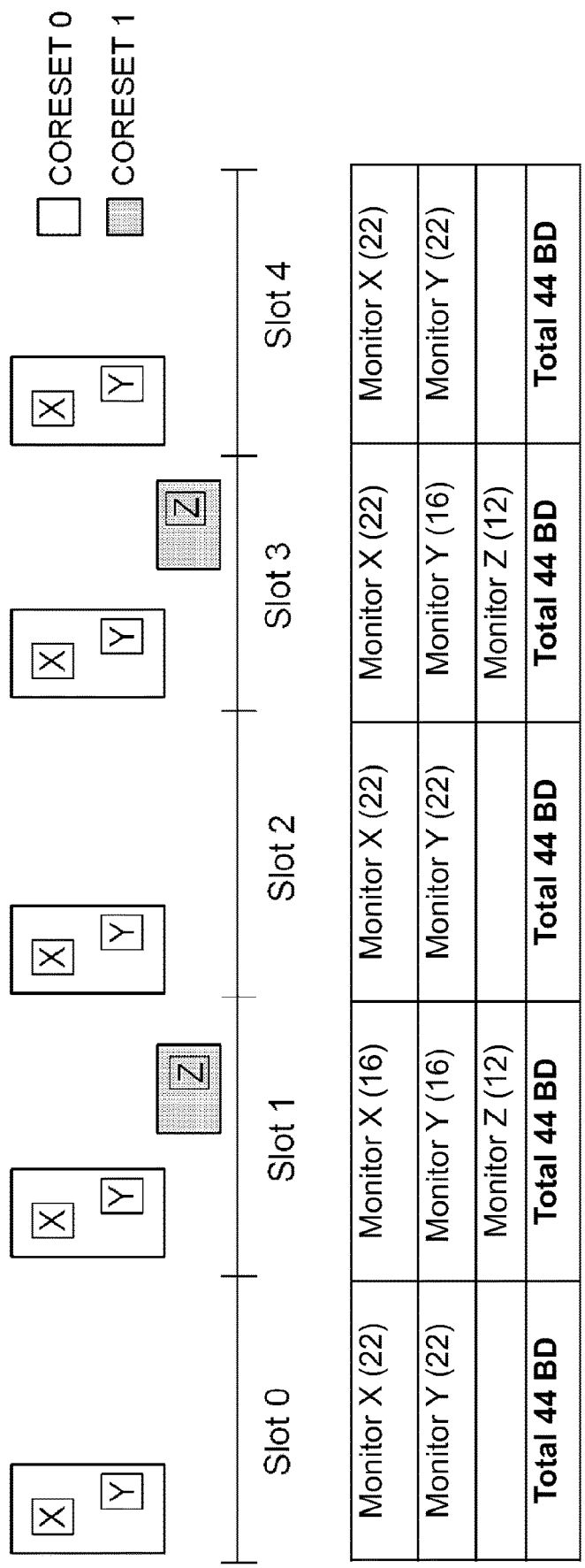

FIG. 5 is a block diagram illustrating two CORESETs with different search spaces and different periodicities where a number of blind decodes varies among slots, according to a particular embodiment. The monitoring periodicity for search spaces X and Y is such that the search spaces are monitored in every slot. However, the number of blind decodes assigned to the search space vary depending on the slot. In the illustrated example, the configuration is as follows.

Search space X and Y: Perform 22 blind decodes in slots 0, 2, 4 . . . and 16 blind decodes in slots 1, 3, 5, . . . . Some irregular patterns with larger duty cycles may also be configured and that this is just a simple example. In the illustrated example, search space Z has a monitoring periodicity that does not require monitoring in every slot but that has the same number of blind decodes assigned to it every time the search space is monitored.

It is possible that different search spaces may have the same monitoring periodicity, but one search space may have its blind decodes vary depending on the slot while the other one does not. An example is illustrated in FIG. 6.

Figure 6:
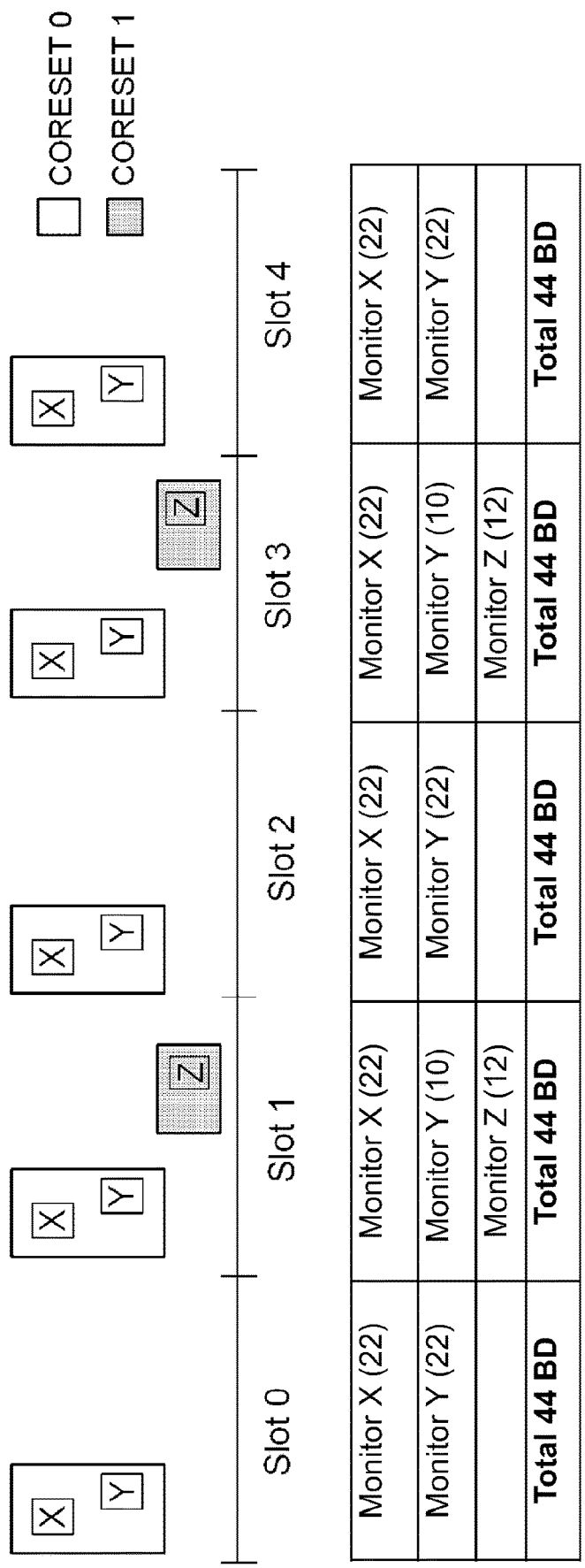

FIG. 6 is another block diagram illustrating two CORESETs with different search spaces and different periodicities where a number of blind decodes varies among slots, according to a particular embodiment. The illustrated example may be interpreted as search space Z borrowing blind decodes only from one of the other search spaces.

Particular embodiments include CORESET monitoring prioritization. In the previous embodiments, the gNB configures the monitoring periodicities and blind decodes appropriately so that the UE follows the particular semi-static configuration given by the gNB.

In some embodiments, the gNB can configure monitoring periodicities and blind decodes to the UE such that the maximum blind decoding capability in a given slot is nominally exceeded. However, the UE limits the number of blind decodes actually performed to the number the UE is capable of by prioritizing the monitoring of certain CORESETs or search spaces or DCI formats over others. An example is illustrated in FIG. 7

Figure 7:
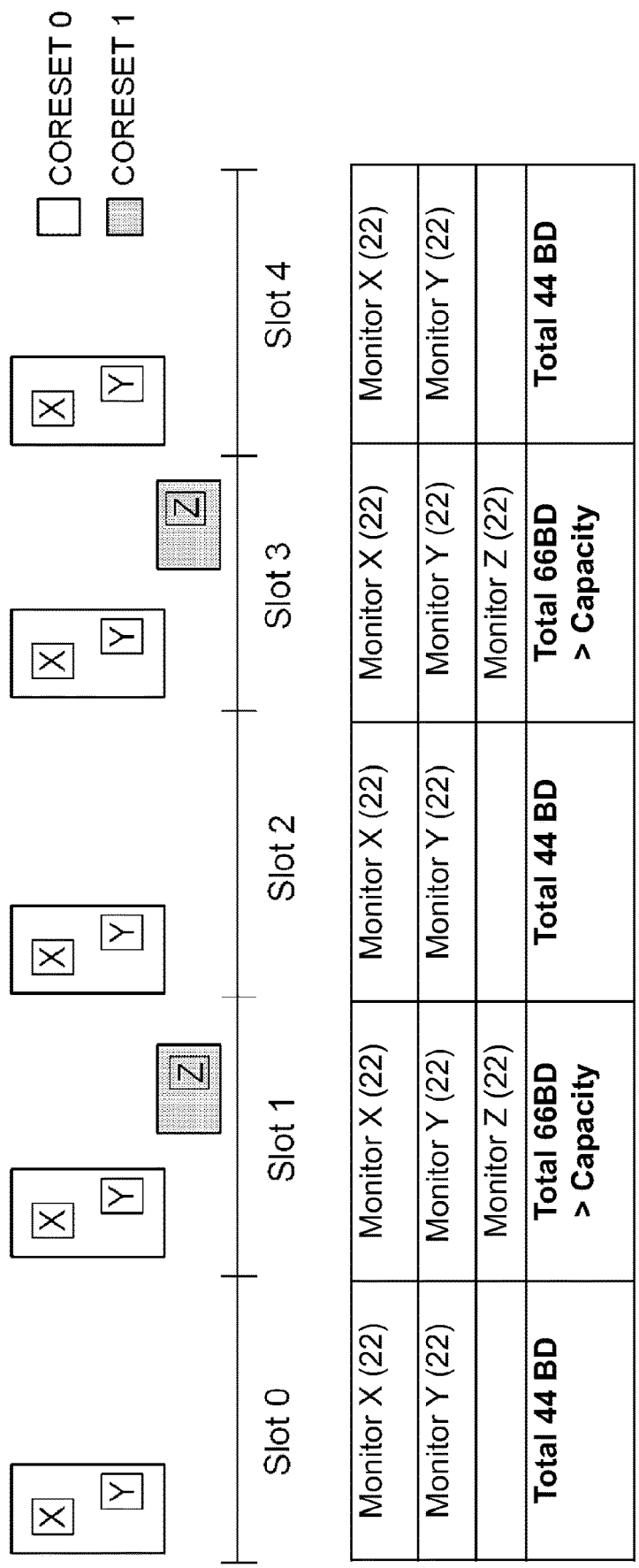

FIG. 7 is a block diagram illustrating two CORESETs with different search spaces and different periodicities where a number of blind decodes may exceed the UE capacity, according to a particular embodiment. In the illustrated example, search spaces X, Y and Z are all configured with 22 blind decodes each. The UE automatically adjusts the blind decodes to fit within the capability by applying some prioritization between search spaces. The configuration could include these prioritizations.

In a particular embodiment, search space j could be assigned a priority number, $p^j$. The blind decodes can then be adjusted at the UE so that the blind decodes for search space j is given by $$B^j = \lfloor (p^j / \Sigma_k p^k) \cdot B_M \rfloor,$$

where $B^j$ is the number of blind decodes assigned to search space j and $B_M$ is the maximum number of blind decodes in a slot.

While this is a general prioritization rule that may be applied, simpler rules may also be used. In one variation of this embodiment, the configuration of a search space may explicitly indicate whether blind decodes from this search space can be borrowed for another search space or not. Blind decodes are then reduced only for search spaces whose configuration indicates that borrowing is allowed. For example, blind decodes for a common search space may be indicated as being fixed, while those for a UE search space may be indicated as being able to be reduced.

Similarly, the configuration of a particular search space may also indicate that this search space is a high priority search space, and that the search space is allowed to borrow blind decodes from other lower priority search spaces.

In another variation of this embodiment, the configuration for a search space may explicitly provide a pointer to other search spaces from which blind decodes may be borrowed by the UE.

In another variation of this embodiment, the prioritization or the ability to borrow blind decodes or not may be dependent on the location of the search space and CORE-SET in the slot. For instance, blind decodes may be borrowed only from UE specific search spaces at the beginning of a slot (say in the first three OFDM symbols), but not those that occur elsewhere in the slot, or vice-versa.

Figure 8:
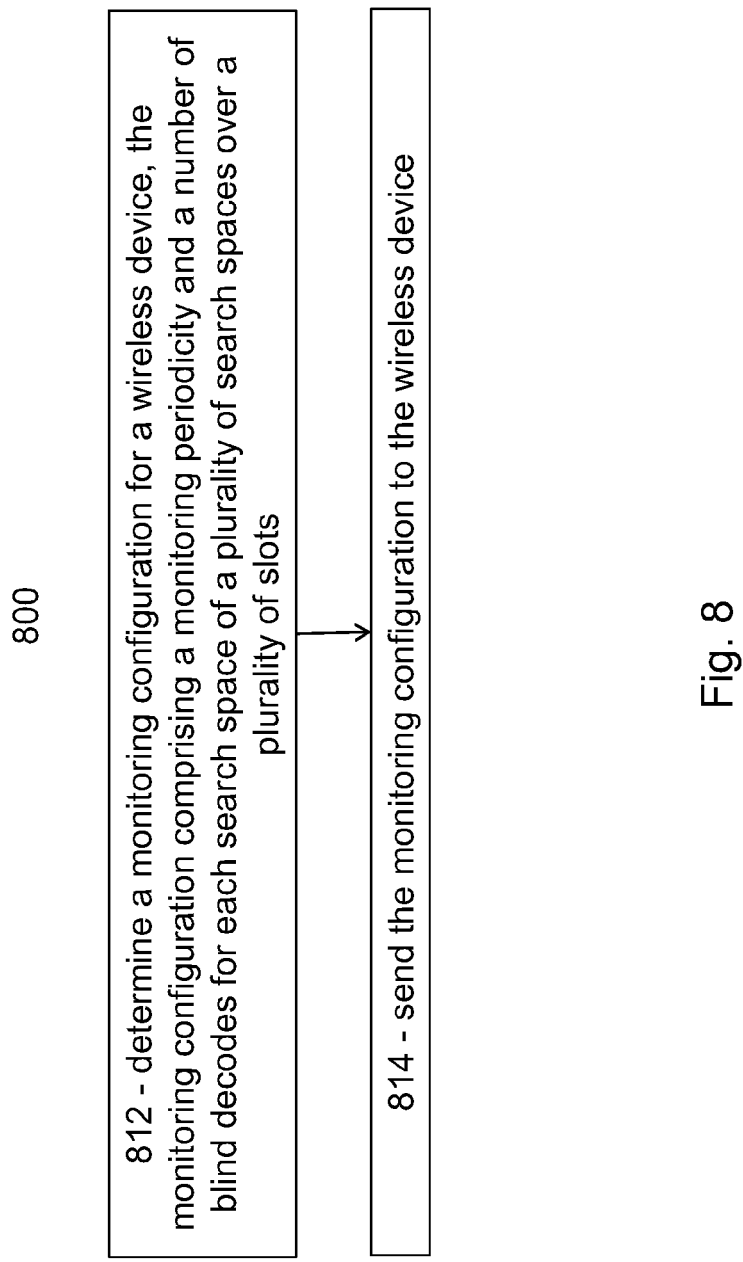
FIG. 8 is a flow diagram illustrating an example method in a network node, according to particular embodiments.
Figure 9:
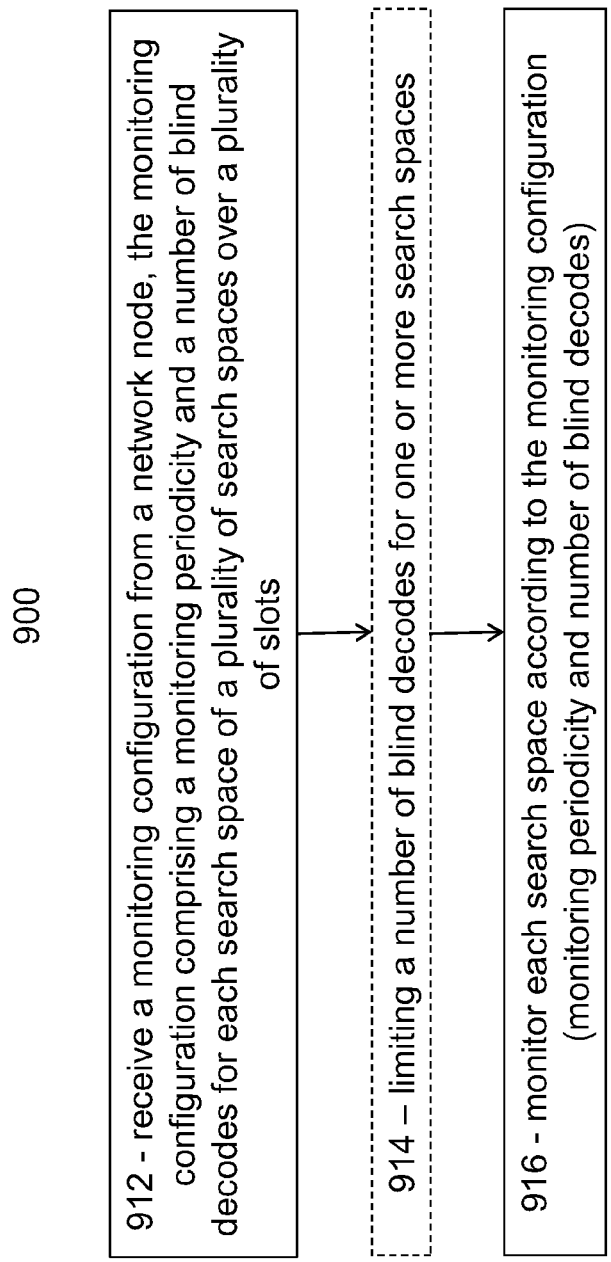
FIG. 9 is a flow diagram illustrating an example method in a wireless device, according to particular embodiments.

General examples of the embodiments described above are illustrated in FIGS. 8 and 9. FIG. 8 is an example in a network node, such as a gNB, and FIG. 9 is an example in a wireless device, such as a UE.

FIG. 8 is a flow diagram illustrating an example method in a network node, according to particular embodiments. In particular embodiments, one or more steps of FIG. 8 may be performed by network node 120 of network 100 described with respect to FIG. 3.

The method begins at step 812, where a network node determines a monitoring configuration for a wireless device. The monitoring configuration comprises a monitoring periodicity and a number of blind decodes for each search space of a plurality of search spaces over a plurality of slots. For example, network node 120 may determine a monitoring configuration for a number of search spaces according to any of the embodiments and examples described with respect to FIGS. 3-7.

In particular embodiments, a total number of blind decodes to be performed in each slot of the plurality of slots is equivalent for all slots (see, e.g., FIGS. 4-6). In some embodiments, the number of blind decodes for each search space is equivalent for all slots (see, e.g., search space X of FIG. 4). The number of blind decodes for each search space may vary among slots (see, e.g., search space Y of FIG. 5). The number of blind decodes for each search space in a slot may be equivalent for all search spaces in the slot (see, e.g., Slot 0 of FIG. 5). The number of blind decodes for each search space in a slot may vary among search spaces in the slot (see, e.g., Slot 1 of FIG. 5). In particular embodiments, the total number of blind decodes to be performed in a slot of the plurality of slots exceeds a total number of blind decodes that the wireless device is capable of performing in the slot (see, e.g., Slot 1 of FIG. 7).

At step 814, the network node sends the monitoring configuration to the wireless device. For example, network node 120 may send the monitoring configuration to wireless device 110.

Modifications, additions, or omissions may be made to method 800 of FIG. 8. Additionally, one or more steps in the method of FIG. 8 may be performed in parallel or in any suitable order. The steps may be repeated over time as necessary.

FIG. 9 is a flow diagram illustrating an example method in a wireless device, according to particular embodiments. In particular embodiments, one or more steps of FIG. 9 may be performed by wireless device 110 of network 100 described with respect to FIG. 2.

The method begins at step 912, where a wireless device receives a monitoring configuration from a network node. The monitoring configuration comprises a monitoring periodicity and a number of blind decodes for each search space of a plurality of search spaces over a plurality of slots. For example, wireless device 110 may receive a monitoring configuration for a number of search spaces according to any of the embodiments and examples described with respect to FIGS. 3-7. Particular configurations are also described with respect to step 812 of FIG. 8.

At step 914, the wireless device may limit a number of blind decodes for one or more search spaces. For example, the total number of blind decodes to be performed in a slot of the plurality of slots may exceed a total number of blind decodes that the wireless device is capable of performing in the slot. The wireless device may limit a number of blind decodes to be performed in one more search spaces so that the total number of blind decodes in each slot is less than or equal to the total number of blind decodes that the wireless device is capable of performing in the slot.

Limiting the number of blind decodes may be based on preconfigured rules for prioritizing a first search space over a second search space. In some embodiments, the PDCCH search space monitoring configuration further comprises an indication whether a search space may be monitored using fewer than the configured number of blind decodes. The indication whether the search space may be monitored using fewer than the configured number of blind decodes may comprise an indication of whether a search space is a common search space or a user equipment specific search space.

At step 916, the wireless device monitors each search space according to the monitoring configuration (i.e., the monitoring periodicity and the number of blind decodes). For example, wireless device 110 may monitor the search space according to the monitoring configuration received from network node 120 in step 912, and according to any modifications or limitations from step 914.

Modifications, additions, or omissions may be made to method 900 of FIG. 9. Additionally, one or more steps in the method of FIG. 9 may be performed in parallel or in any suitable order. The steps may be repeated over time as necessary.

Figure 10B:
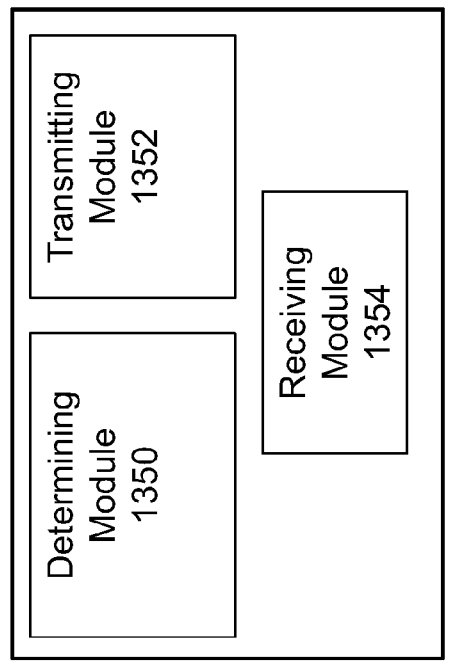
FIG. 10B is a block diagram illustrating example components of a wireless device.
Figure 10A:
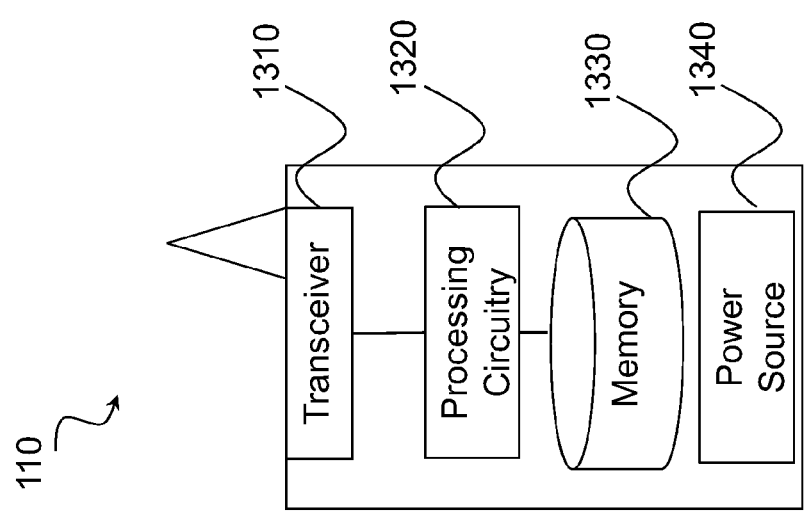
FIG. 10A is a block diagram illustrating an example embodiment of a wireless device.

FIG. 10A is a block diagram illustrating an example embodiment of a wireless device. The wireless device is an example of the wireless devices 110 illustrated in FIG. 2. In particular embodiments, the wireless device is capable of receiving a monitoring configuration from a network node. The monitoring configuration comprises a monitoring periodicity and a number of blind decodes for each search space of a plurality of search spaces over a plurality of slots. The wireless device may also monitor each search space according to the monitoring configuration (i.e., the monitoring periodicity and the number of blind decodes). If the total number of blind decodes to be performed in a slot exceeds a total number of blind decodes that the wireless device is capable of performing in the slot, then the wireless device may limit a number of blind decodes to be performed in one more search spaces.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1310, processing circuitry 1320, memory 1330, and power source 1340. In some embodiments, transceiver 1310 facilitates transmitting wireless signals to and receiving wireless signals from wireless network node 120 (e.g., via an antenna), processing circuitry 1320 executes instructions to provide some or all of the functionality described herein as provided by the wireless device, and memory 1330 stores the instructions executed by processing circuitry 1320. Power source 1340 supplies electrical power to one or more of the components of wireless device 110, such as transceiver 1310, processing circuitry 1320, and/or memory 1330.

Processing circuitry 1320 includes any suitable combination of hardware and software implemented in one or more integrated circuits or modules to execute instructions and manipulate data to perform some or all of the described functions of the wireless device. In some embodiments, processing circuitry 1320 may include, for example, one or more computers, one more programmable logic devices, one or more central processing units (CPUs), one or more microprocessors, one or more applications, and/or other logic, and/or any suitable combination of the preceding. Processing circuitry 1320 may include analog and/or digital circuitry configured to perform some or all of the described functions of wireless device 110. For example, processing circuitry 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory computer-readable and/or computer-executable memory devices that store information.

Power source 1340 is generally operable to supply electrical power to the components of wireless device 110. Power source 1340 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 10A) responsible for providing certain aspects of the wireless device's functionality, including any of the functionality described above and/or any additional functionality (including any functionality necessary to support the solution described above).

FIG. 10B is a block diagram illustrating example components of a wireless device 110. The components may include determining module 1350, transmitting module 1352 and receiving module 1354.

Determining module 1350 may perform the determining functions of wireless device 110. For example, determining module 1350 may determine total number of blind decodes to be performed in a slot of the plurality of slots exceeds a total number of blind decodes that the wireless device is capable of performing in the slot, and limit a number of blind decodes to be performed in one more search spaces (or CORESETS, DCI format, etc.) according to any of the examples and embodiments described above. In certain embodiments, determining module 1350 may include or be included in processing circuitry 1320. In particular embodiments, determining module 1350 may communicate with transmitting module 1352 and receiving module 1354.

Transmitting module 1352 may perform the transmitting functions of wireless device 110. In certain embodiments, transmitting module 1352 may include or be included in processing circuitry 1320. In particular embodiments, transmitting module 1352 may communicate with determining module 1350 and receiving module 1354.

Receiving module 1354 may perform the receiving functions of wireless device 110. For example, receiving module 1354 may receive a monitoring configuration according to any of the examples and embodiments described above. In certain embodiments, receiving module 1354 may include or be included in processing circuitry 1320. In particular embodiments, transmitting module 1352 may communicate with determining module 1350 and transmitting module 1352.

Figure 11B:
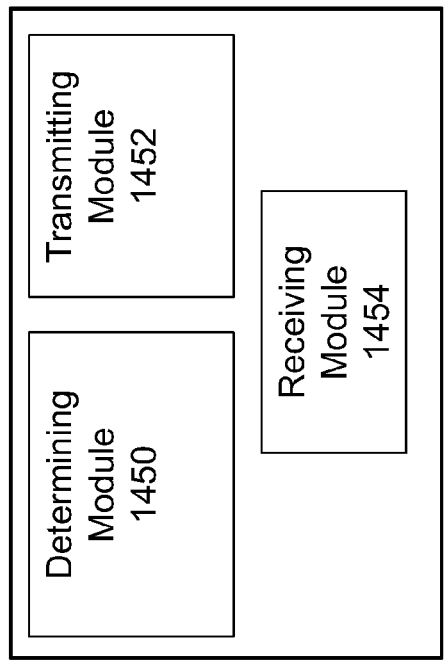
FIG. 11B is a block diagram illustrating example components of a network node.
Figure 11A:
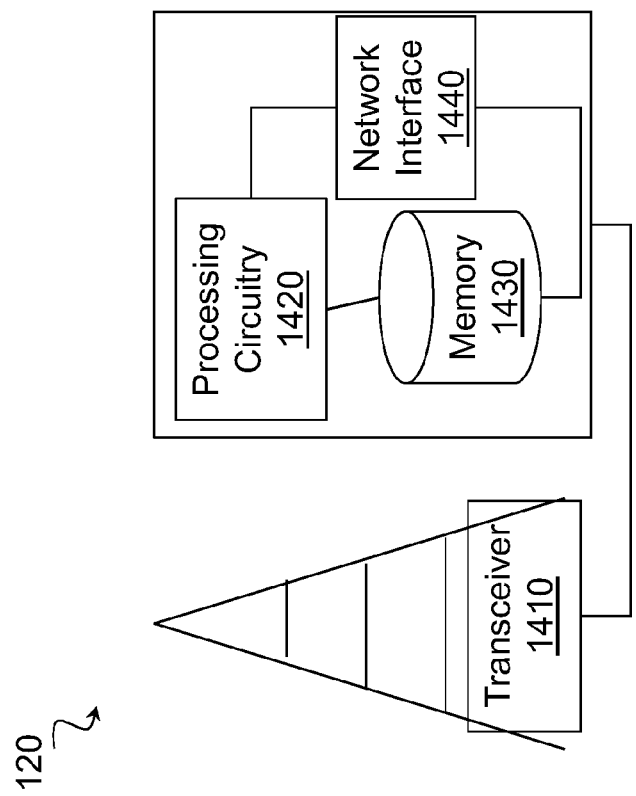
FIG. 11A is a block diagram illustrating an example embodiment of a network node.

FIG. 11A is a block diagram illustrating an example embodiment of a network node. The network node is an example of the network node 120 illustrated in FIG. 2. In particular embodiments, the network node is capable of determining a monitoring configuration for a wireless device. The monitoring configuration comprises a monitoring periodicity and a number of blind decodes for each search space (or CORESETS, DCI format, etc.) of a plurality of search spaces (or CORESETS, DCI format, etc.) over a plurality of slots. The network node is capable of sending the monitoring configuration to a wireless device.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1410, at least one processing circuitry 1420, at least one memory 1430, and at least one network interface 1440. Transceiver 1410 facilitates transmitting wireless signals to and receiving wireless signals from a wireless device, such as wireless devices 110 (e.g., via an antenna); processing circuitry 1420 executes instructions to provide some or all of the functionality described above as being provided by a network node 120; memory 1430 stores the instructions executed by processing circuitry 1420; and network interface 1440 communicates signals to backend network components, such as a gateway, switch, router, Internet, Public Switched Telephone Network (PSTN), controller, and/or other network nodes 120. Processing circuitry 1420 and memory 1430 can be of the same types as described with respect to processing circuitry 1320 and memory 1330 of FIG. 10A above.

In some embodiments, network interface 1440 is communicatively coupled to processing circuitry 1420 and refers to any suitable device operable to receive input for network node 120, send output from network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

FIG. 11B is a block diagram illustrating example components of a network node 120. The components may include determining module 1450, transmitting module 1452 and receiving module 1454.

Determining module 1450 may perform the determining functions of network node 120. For example, determining module 1450 may determine a monitoring configuration for a wireless device according to any of the examples and embodiments described above. In certain embodiments, determining module 1450 may include or be included in processing circuitry 1420. In particular embodiments, determining module 1450 may communicate with transmitting module 1452 and receiving module 1454.

Transmitting module 1452 may perform the transmitting functions of network node 120. For example, transmitting module 1452 may transmit a monitoring configuration to a wireless device according to any of the examples and embodiments described above. In certain embodiments, transmitting module 1452 may include or be included in processing circuitry 1420. In particular embodiments, transmitting module 1452 may communicate with determining module 1450 and receiving module 1454.

Receiving module 1454 may perform the receiving functions of network node 120. In certain embodiments, receiving module 1454 may include or be included in processing circuitry 1420. In particular embodiments, transmitting module 1452 may communicate with determining module 1450 and transmitting module 1452.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BBU Baseband Unit
BTS Base Transceiver Station
CC Component Carrier
CORESET Control-Resource Set
CQI Channel Quality Information
CSI Channel State Information
D2D Device to Device
DFT Discrete Fourier Transform
DMRS Demodulation Reference Signal
eMBB Enhanced Mobile Broadband
eNB eNodeB
FDD Frequency Division Duplex
FFT Fast Fourier Transform
gNB Next-generation NodeB
LAA Licensed-Assisted Access
LBT Listen-before-talk
LTE Long Term Evolution
LTE-U LTE in Unlicensed Spectrum
M2M Machine to Machine
MCS Modulation and Coding Scheme
MIB Master Information Block
MIMO Multi-Input Multi-Output
MTC Machine Type Communication
NR New Radio
OFDM Orthogonal Frequency Division Multiplexing
PDCCH Physical Downlink Control Channel
PRB Physical Resource Block
PUCCH Physical Uplink Control Channel
PUSCH Physical Uplink Shared Channel
RAN Radio Access Network
RAT Radio Access Technology
RBS Radio Base Station
RNC Radio Network Controller
RRC Radio Resource Control
RRH Remote Radio Head
RRU Remote Radio Unit
SCell Secondary Cell
SI System Information
SIB System Information Block
SR Scheduling Request
TB Transport Block
TBS Transport Block Size
TDD Time Division Duplex
TTI Transmission Time Interval
UE User Equipment
UL Uplink
URLLC Ultra Reliable Low Latency Communication
UTRAN Universal Terrestrial Radio Access Network
WAN Wireless Access Network

The invention claimed is:

1. A method for use in a network node of a wireless communication network, the method comprising:
    determining a control channel search space monitoring configuration for a wireless device, the control channel search space monitoring configuration comprising a monitoring periodicity and a number of blind decodes for each search space of a plurality of search spaces over a plurality of slots, wherein a number of blind decodes to be performed in a first slot of the plurality of slots exceeds a threshold number of blind decodes for the first slot, the first slot comprising a first and a second search space; and
    sending the control channel search space monitoring configuration to the wireless device, wherein the control channel search space monitoring configuration is used by the wireless device to limit a number of blind decodes to be performed in the second search space so that the number of blind decodes in the first slot is less than or equal to the threshold number of blind decodes for the first slot, and wherein the number of blind decodes is limited based on rules for prioritizing a first search space over a second search space.

2. The method of claim 1, wherein the control channel search space monitoring configuration further comprises an indication whether a search space may be monitored using fewer than the configured number of blind decodes.

3. The method of claim 2, wherein the indication whether the search space may be monitored using fewer than the configured number of blind decodes comprises an indication of whether a search space is a common search space or a user equipment specific search space.

4. A network node operable in a wireless communication network, the network node comprising:
a memory operable to store instructions; and
processing circuitry operable to execute the instructions to cause the network node to:
determine a control channel search space monitoring configuration for a wireless device, the control channel search space monitoring configuration comprising a monitoring periodicity and a number of blind decodes for each search space of a plurality of search spaces over a plurality of slots, wherein a number of blind decodes to be performed in a first slot of the plurality of slots exceeds a threshold number of blind decodes for the first slot, the first slot comprising a first and a second search space; and
send the control channel search space monitoring configuration to the wireless device, wherein the monitoring configuration is used by the wireless device to limit a number of blind decodes to be performed in the second search space so that the number of blind decodes in the first slot is less than or equal to the threshold number of blind decodes for the first slot, and wherein the number of blind decodes is limited based on rules for prioritizing a first search space over a second search space.

5. The network node of claim 4, wherein the control channel search space monitoring configuration further comprises an indication whether a search space may be monitored using fewer than the configured number of blind decodes.

6. The network node of claim 5, wherein the indication whether the search space may be monitored using fewer than the configured number of blind decodes comprises an indication of whether a search space is a common search space or a user equipment specific search space.

7. A method for use in a wireless device, the method comprising:
receiving a control channel search space monitoring configuration from a network node, the control channel search space monitoring configuration comprising a monitoring periodicity and a number of blind decodes for each search space of a plurality of search spaces over a plurality of slots, wherein a number of blind decodes to be performed in a first slot of the plurality of slots exceeds a threshold number of blind decodes for the first slot, the first slot comprising a first and a second search space;
limiting a number of blind decodes to be performed in the second search space so that the number of blind decodes in the first slot is less than or equal to the threshold number of blind decodes for the first slot, wherein limiting the number of blind decodes is based on rules for prioritizing a first search space over a second search space; and
monitoring the first search space according to the monitoring periodicity and the received number of blind decodes and the second search space according to the monitoring periodicity and the limited number of blind decodes.

8. The method of claim 7, wherein a total number of blind decodes to be performed in each slot of the plurality of slots is equivalent for all slots.

9. The method of claim 7, wherein the number of blind decodes for each search space is equivalent for all slots.

10. The method of claim 7, wherein the number of blind decodes for each search space varies among slots.

11. The method of claim 7, wherein the number of blind decodes for each search space in a slot is equivalent for all search spaces in the slot.

12. The method of claim 7, wherein the number of blind decodes for each search space in a slot varies among search spaces in the slot.

13. The method of claim 7, wherein the control channel search space monitoring configuration further comprises an indication whether a search space may be monitored using fewer than the configured number of blind decodes.

14. The method of claim 13, wherein the indication whether the search space may be monitored using fewer than the configured number of blind decodes comprises an indication of whether a search space is a common search space or a user equipment specific search space.

15. A wireless device operable in a wireless communication network, the wireless device comprising:
a memory operable to store instructions; and
processing circuitry operable to execute the instructions to cause the wireless device to:
receive a control channel search space monitoring configuration from a network node, the control channel search space monitoring configuration comprising a monitoring periodicity and a number of blind decodes for each search space of a plurality of search spaces over a plurality of slots, wherein a number of blind decodes to be performed in a first slot of the plurality of slots exceeds a threshold number of blind decodes for the first slot, the first slot comprising a first and a second search space;
limit a number of blind decodes to be performed in the second search space so that the number of blind decodes in the first slot is less than or equal to the maximum number of blind decodes for the first slot, wherein limiting the number of blind decodes is based on rules for prioritizing a first search space over a second search space; and
monitor the first search space according to the monitoring periodicity and the received number of blind decodes and the second search space according to the monitoring periodicity and the limited number of blind decodes.

16. The wireless device of claim 15, wherein a total number of blind decodes to be performed in each slot of the plurality of slots is equivalent for all slots.

17. The wireless device of claim 15, wherein the number of blind decodes for each search space is equivalent for all slots.

18. The wireless device of claim 15, wherein the number of blind decodes for each search space varies among slots.

19. The wireless device of claim 15, wherein the number of blind decodes for each search space in a slot is equivalent for all search spaces in the slot.

20. The wireless device of claim 15, wherein the number of blind decodes for each search space in a slot varies among search spaces in the slot.

21. The wireless device of claim 15, wherein the control channel search space monitoring configuration further comprises an indication whether a search space may be monitored using fewer than the configured number of blind decodes.

22. The wireless device of claim 21, wherein the indication whether the search space may be monitored using fewer than the configured number of blind decodes comprises an indication of whether a search space is a common search space or a user equipment specific search space.

* * * * *